(12) United States Patent
Inose et al.

(10) Patent No.: US 11,607,975 B2
(45) Date of Patent: *Mar. 21, 2023

(54) VEHICLE SEAT

(71) Applicant: TS TECH CO., LTD., Asaka (JP)

(72) Inventors: Yasuo Inose, Tochigi (JP); Kensuke Mizoi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,668

(22) Filed: Apr. 21, 2022

(65) Prior Publication Data

US 2022/0242279 A1   Aug. 4, 2022

Related U.S. Application Data

(63) Continuation of application No. 16/755,775, filed as application No. PCT/JP2018/038771 on Oct. 18, 2018, now Pat. No. 11,332,048.

(30) Foreign Application Priority Data

Oct. 20, 2017   (JP) ................. 2017-203636

(51) Int. Cl.
*B60N 2/68* (2006.01)
*B60N 2/16* (2006.01)
*B60N 2/02* (2006.01)

(52) U.S. Cl.
CPC ........... *B60N 2/165* (2013.01); *B60N 2/0232* (2013.01); *B60N 2/68* (2013.01); *B60N 2002/024* (2013.01)

(58) Field of Classification Search
CPC ........ B60N 2/165; B60N 2/68; B60N 2/1615; B60N 2002/024; B60N 2/1665; B60N 2/16; B60N 2/14; B60N 2/08; B60N 2/2251; B60N 2/2352; B60N 2/146; B60N 2/3063; B60N 2/3038; B60N 2/919
See application file for complete search history.

(56) References Cited

U.S. PATENT DOCUMENTS

| | | |
|---|---|---|
| 4,973,105 A | 11/1990 | Itou |
| 9,227,530 B2 | 1/2016 | Hoshi et al. |
| 9,604,550 B2 | 3/2017 | Ito |
| 9,821,690 B2 | 11/2017 | Nakagawa |
| 10,207,608 B2 | 2/2019 | Yamakawa |
| 10,214,117 B2 | 2/2019 | Tanaka et al. |
| 10,406,944 B2 | 9/2019 | Ishihara et al. |
| 2005/0225133 A1 | 10/2005 | Aufrere et al. |
| 2008/0277993 A1 | 11/2008 | Blankart |
| 2009/0267397 A1 | 10/2009 | Kubota |

(Continued)

FOREIGN PATENT DOCUMENTS

| | | |
|---|---|---|
| CA | 2 852 450 A1 | 1/2015 |
| CN | 101130344 A | 2/2008 |

(Continued)

*Primary Examiner* — Timothy J Brindley
(74) *Attorney, Agent, or Firm* — Carrier Shende & Associates, P.C.; Joseph P. Carrier; Fulchand P. Shende

(57) ABSTRACT

A vehicle seat (11) includes a seat frame (22*a*) having an opening (46) in a plate-shaped part (43), and an actuator (31) mounted on the plate-shaped part (43). Accordingly, it is possible to provide a vehicle seat that further contributes to quietness in the interior of a vehicle.

10 Claims, 6 Drawing Sheets

(56) References Cited

U.S. PATENT DOCUMENTS

| | | | |
|---|---|---|---|
| 2010/0072772 A1* | 3/2010 | Gamache | B60N 2/0232 297/354.1 |
| 2011/0169317 A1 | 7/2011 | Fujita et al. | |
| 2015/0084390 A1* | 3/2015 | Tanaka | B60N 2/4263 297/338 |
| 2015/0352982 A1 | 12/2015 | Watanabe | |
| 2015/0360591 A1 | 12/2015 | Roll et al. | |
| 2016/0059752 A1 | 3/2016 | Kishida et al. | |
| 2016/0122023 A1 | 5/2016 | Lichota | |
| 2017/0120778 A1 | 5/2017 | Suzuki et al. | |
| 2017/0203677 A1 | 7/2017 | Becker et al. | |
| 2017/0259713 A1 | 9/2017 | Kostin | |
| 2018/0141476 A1 | 5/2018 | Tobata et al. | |
| 2018/0194250 A1* | 7/2018 | Arakawa | B60N 2/067 |
| 2018/0208087 A1 | 7/2018 | Baba et al. | |
| 2018/0236903 A1 | 8/2018 | Chatwin et al. | |
| 2019/0389336 A1 | 12/2019 | Malinowski et al. | |
| 2021/0001757 A1 | 1/2021 | Toda | |
| 2021/0078474 A1 | 3/2021 | Edwards et al. | |

FOREIGN PATENT DOCUMENTS

| | | |
|---|---|---|
| EP | 3 543 066 A1 | 9/2019 |
| JP | H02-90148 U | 7/1990 |
| JP | H06-33727 U | 5/1994 |
| JP | 2002-160562 A | 6/2002 |
| JP | 2014-129006 A | 7/2014 |
| JP | 2014-129007 A | 7/2014 |
| JP | 5617660 B2 | 11/2014 |
| JP | 2016-159820 A | 9/2016 |
| JP | 2017-158332 A | 9/2017 |
| WO | 2013/061715 A1 | 5/2013 |
| WO | 2014/077387 A1 | 5/2014 |
| WO | 2017/022675 A1 | 2/2017 |
| WO | 2017/036907 A1 | 3/2017 |
| WO | 2017/089310 A1 | 6/2017 |

\* cited by examiner

RIGHT(INSIDE) ←————→ LEFT(OUTSIDE)

VEHICLE SEAT

CROSS-REFERENCE TO RELATED APPLICATION

This application is a continuation of U.S. patent application Ser. No. 16/755,775, filed Apr. 13, 2020, which is the US National Phase application of PCT/JP2018/038771, filed Oct. 18, 2018, which claims priority from Japanese Patent Application No. 2017-203636, filed on Oct. 20, 2017. The entire contents of each of the referenced priority documents are incorporated herein by reference.

TECHNICAL FIELD

The present invention relates to a vehicle seat mounted on a vehicle such as for example a four-wheel motor vehicle.

BACKGROUND ART

Patent Document 1 discloses a seat cushion that ascends and descends with respect to a floor of a vehicle. The seat cushion includes a seat cushion frame supporting a pad of the seat cushion. The seat cushion frame is supported on a base frame above a slide rail. The seat cushion frame is linked to the base frame via a link mechanism. The seat cushion frame ascends and descends with respect to the base frame around a swing axis of a link member.

RELATED ART DOCUMENTS

Patent Documents

Patent Document 1: Japanese Patent No. 5617660

SUMMARY OF THE INVENTION

Problems to be Solved by the Invention

An actuator is linked to the link mechanism. The actuator includes an electric motor that triggers up-and-down movement of the seat cushion frame via a transmission mechanism including sequentially meshing gears. Until now, when designing a vehicle seat, no consideration has been given to vibration noise due to such an actuator.

The present invention has been accomplished in light of the above circumstances, and it is an object thereof to provide a vehicle seat that further contributes to quietness in the interior of a vehicle.

Means for Solving the Problem

According to a first aspect of the present invention, there is provided a vehicle seat comprising a seat frame having an opening in a plate-shaped part, and an actuator mounted on the plate-shaped part.

According to a second aspect of the present invention, in addition to the first aspect, the opening is disposed at a position where the opening faces the actuator.

According to a third aspect of the present invention, in addition to the first or second aspect, the seat frame has a bent region that is bent from an edge of the plate-shaped part and enhances the stiffness of the edge by an effect of being curved.

According to a fourth aspect of the present invention, in addition to the third aspect, the bent region is folded back via an upper end that goes away from a plate face of the plate-shaped part so as to form a double wall.

According to a fifth aspect of the present invention, in addition to the fourth aspect, the bent region is formed as a pair sandwiching a space that is in contact with the plate face of the plate-shaped part.

According to a sixth aspect of the present invention, in addition to the fifth aspect, the bent regions have a larger dimension in a longitudinal direction along the edge compared with a gap via which the bent regions face each other with the space sandwiched therebetween and define the plate-shaped part as a band shape along the longitudinal direction.

According to a seventh aspect of the present invention, in addition to the sixth aspect, the seat frame has a second opening in the plate-shaped part at a position that deviates from the opening in the longitudinal direction.

According to an eighth aspect of the present invention, in addition to the seventh aspect of the present invention, the seat frame is a side frame of a seat cushion, and the opening and the second opening are disposed at a position spaced from the respective bent regions.

According to a ninth aspect of the present invention, in addition to the eighth aspect, the vehicle seat comprises a harness that passes through the second opening from an inside toward an outside, and a coupler that is linked to the harness outside the side frame, and the coupler is disposed at a position where the coupler faces the opening.

According to a tenth aspect of the present invention, in addition to the first aspect, the seat frame is a seat cushion frame having a pair of left and right side frames, the actuator is mounted on the plate-shaped part of one side frame and the opening is formed therein, and an opening is further formed in the plate-shaped part of the other side frame.

According to an eleventh aspect of the present invention, in addition to the tenth aspect, the other side frame has a larger number of the openings than the number of openings provided in the one side frame.

Effects of the Invention

In accordance with the first aspect, since the mass of the seat frame is adjusted by the action of the opening, resonance of the seat frame with respect to operating vibration of the actuator can be suppressed. As a result, vibration noise of the seat frame is reduced.

In accordance with the second aspect, since in the plate-shaped part, vibration easily occurs at a position close to the actuator, placing the opening at a position at which it faces the actuator enables resonance to be suppressed effectively.

In accordance with the third aspect, since the stiffness of the plate-shaped part is enhanced by the action of the bent regions, the resonance of the seat frame can be suppressed.

In accordance with the fourth aspect, the stiffness of the bent region can reliably be enhanced. The stiffness of the seat frame can be ensured.

In accordance with the fifth aspect, since the space, which is in contact with the plate face and is adjacent to the opening, is sandwiched by the bent regions, even when the opening is formed in the plate-shaped part, the stiffness of the plate-shaped part can be ensured.

In accordance with the sixth aspect, since the bent region extends lengthwise along the edge of the plate-shaped part compared with the breadth of the plate-shaped part, the stiffness of the plate-shaped part can be reliably enhanced.

In accordance with the seventh aspect, due to the increase in the openings in the plate-shaped part, vibration noise is further reduced.

In accordance with the eighth aspect, the further the plate-shaped part is away from the bent region, the more easily vibration occurs. Due to the opening and the second opening being disposed in a region that is susceptible to vibration, the effect in suppressing resonance can be enhanced.

In accordance with the ninth aspect, since the coupler is disposed at a position at which it faces the opening, a state in which the coupler is connected can be ascertained through the opening from the inside of the side frame.

In accordance with the tenth aspect, since in the other side frame, the stiffness of the plate-shaped part is not reinforced due to actuator being mounted, the plate-shaped part has a large breadth and resonance easily occurs, but due to the opening being formed in the other side frame, the resonance of the side frame can be suppressed. As a result, vibration noise of the seat frame is reduced.

In accordance with the eleventh aspect, since the actuator is not mounted on the other side frame, resonance occurs more easily in the other side frame than in the one side frame, but due to the larger number of openings being formed in the other side frame than in the one side frame, the resonance of the other side frame can be suppressed.

EXPLANATION OF REFERENCE NUMERALS AND SYMBOLS

Figure 1:
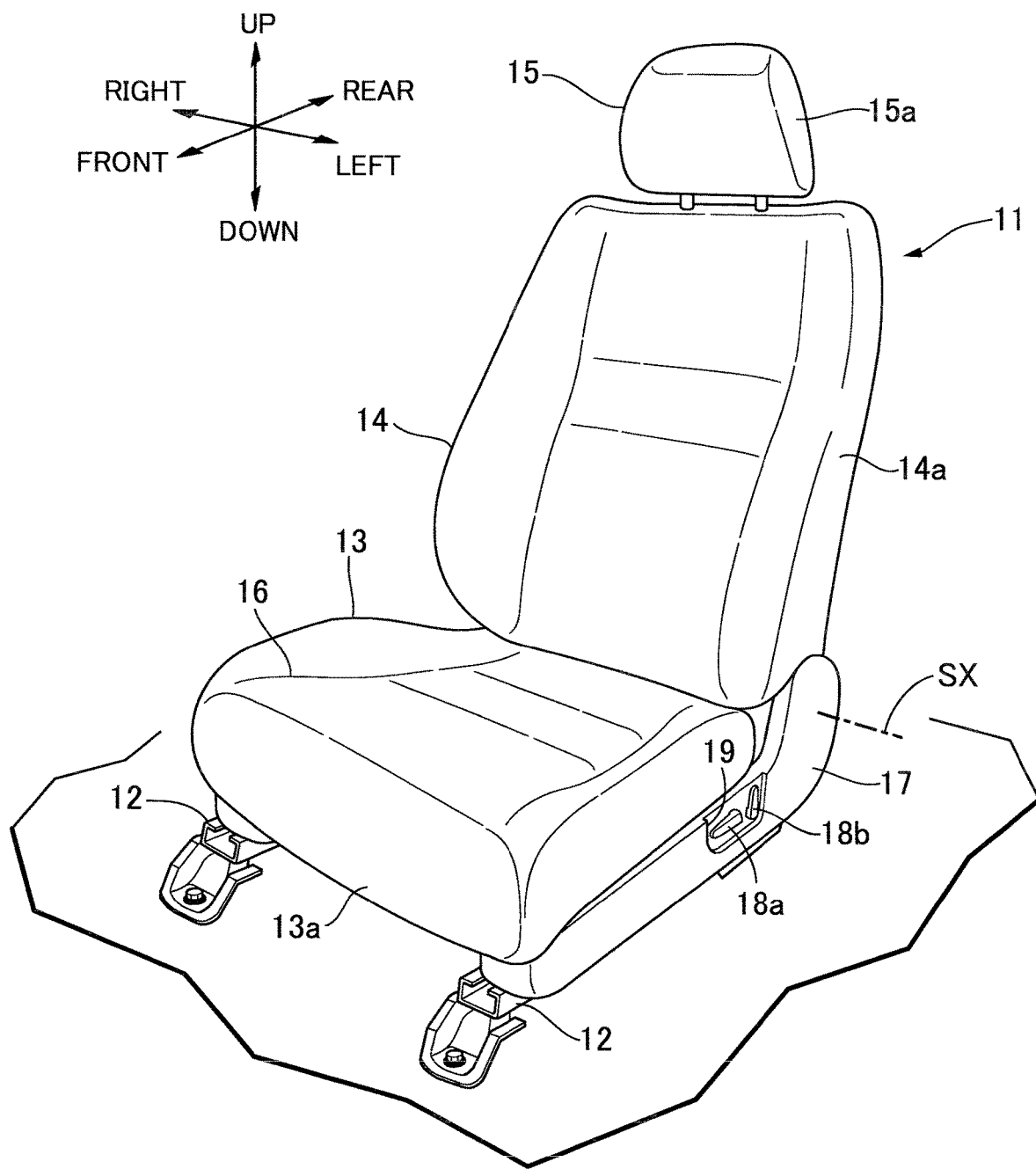
FIG. 1 is a perspective view schematically showing the overall arrangement of a vehicle seat related to one embodiment of the present invention. (first embodiment)

11 Vehicle seat
13 Seat cushion
21 Seat frame
22 Seat cushion frame
22*a* Side frame
31 Actuator
43 Plate-shaped part
44*a* Bent region
44*b* Bent region
46 Opening (first opening)
47 Second opening (second opening)
48 Coupler (female coupler)
49 Harness
55 Opening

MODES FOR CARRYING OUT THE INVENTION

An embodiment of the present invention is explained below by reference to the attached drawings. In the explanation below, front and rear, left and right, and up and down are directions as viewed by a person sitting on a vehicle seat.

FIRST EMBODIMENT

FIG. 1 schematically shows the overall arrangement of a vehicle seat related to a first embodiment of the present invention. The vehicle seat 11 includes a slide rail 12 that is placed on for example a floor of a vehicle, a seat cushion 13 that is supported on the slide rail 12 so that it can slide in the fore-and-aft direction and receives the hip and thigh of an occupant, a seat back 14 that is linked to the seat cushion 13 so that it can swing in the fore-and-aft direction around a swing axis SX and receives the back of the occupant, and a headrest 15 that is supported at the upper end of the seat back 14 and receives the head of the occupant. The seat cushion 13, the seat back 14, and the headrest 15 individually have skin materials 13*a*, 14*a*, and 15*a* that are wrapped around a pad in the interior. The skin materials 14*a* and 15*a* are in intimate contact with an outer face of the pad along a depression of the pad due to the action of a drawing-in thread 16. Details of the pad are described later.

The seat cushion 13 includes a side cover 17. A first switch 18*a* and a second switch 18*b* are mounted on the side cover 17. The first switch 18*a* and the second switch 18*b* are housed in a recess 19 defined in the side cover 17. The first switch 18*a* is formed from a knob that is long in the fore-and-aft direction. When the first switch 18*a* is operated forward, the seat cushion 13 and the seat back 14 move forward. When the first switch 18*a* is operated rearward, the seat cushion 13 and the seat back 14 move rearward. When the first switch 18*a* is operated upward, the seat cushion 13 and the seat back 14 move upward. When the first switch 18*a* is operated downward, the seat cushion 13 and the seat back 14 move downward. The second switch 18*b* is formed from a knob that is long in the up-and-down direction. When the second switch 18*b* is operated forward, the seat back 14 swings forward around the swing axis SX. When the second switch 18*b* is operated rearward, the seat back 14 swings rearward around the swing axis SX.

Figure 2:
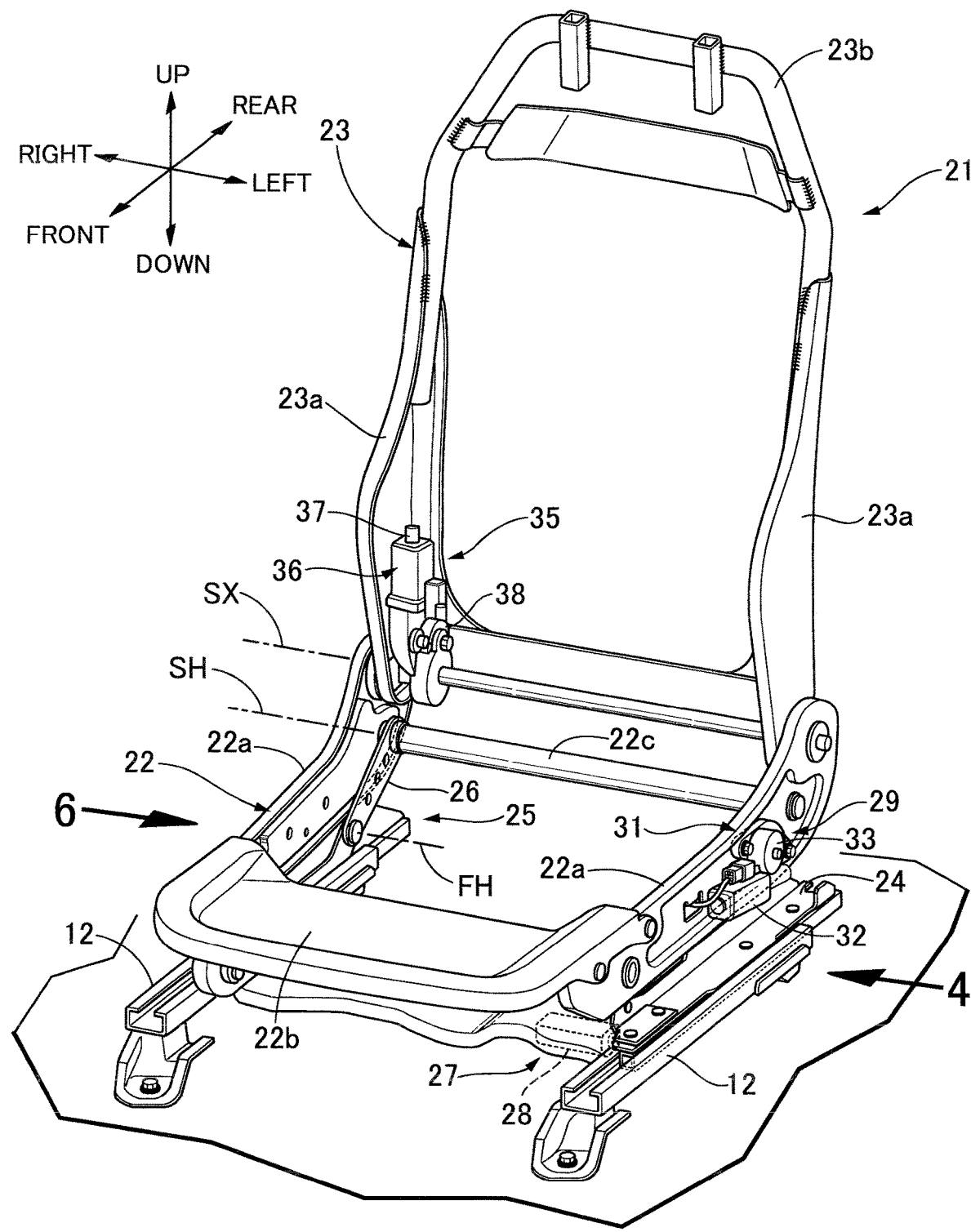
FIG. 2 is a perspective view schematically showing the structure of a seat frame.

As shown in FIG. 2, the vehicle seat 11 includes a seat frame 21 supporting the pads. The seat frame 21 includes a seat cushion frame 22 supporting the pad of the seat cushion 13, a seat back frame 23 linked to the seat cushion frame 22 so that it can swing around the swing axis SX and supporting the pad of the seat back 14, and a base frame 24 that is guided by the slide rail 12 so that it can move forward and rearward in the longitudinal direction and supports the seat cushion frame 22 above the slide rail 12. The seat cushion frame 22 is linked to the base frame 24 via a link mechanism 25. The link mechanism 25 includes a link member 26 that has one end joined to the base frame 24 so that it can rotate around a horizontal axis FH extending in the left-and-right direction and the other end joined to the seat cushion frame 22 so that it can rotate around a horizontal axis SH extending in the left-and-right direction in parallel with the horizontal axis FH. The link member 26 guides up-and-down movement of the seat cushion frame 22 with respect to the base frame 24 around the horizontal axis FH.

The seat cushion frame 22 includes side frames 22*a* extending side by side with the individual slide rails 12, a pan frame 22*b* connecting the side frames 22*a* to each other at the front end of the seat cushion 13, and a link pipe 22*c* linking the side frames 22*a* to each other at the rear end of the seat cushion 13. A plurality of S springs (not illustrated) are disposed between the pan frame 22*b* and the link pipe 22*c*. The individual S springs extend in the fore-and-aft direction in a zig-zag shape. The zig-zag shape is formed by alternatingly combining a wire rod extending in the fore-and-aft direction and a wire rod extending in the left-and-right direction.

An electric fore-and-aft movement device 27 is mounted on the base frame 24. The electric fore-and-aft movement device 27 includes an electric motor 28 supported on the base frame 24. The electric motor 28 generates motive power in response to the supply of electric power. Electric power is supplied based on the operation of the first switch 18a. Motive power of the electric motor 28 triggers fore-and-aft movement of the base frame 24 along the slide rail 12.

An electric up-and-down movement device 29 is mounted on the side frame 22a of the seat cushion frame 22. The electric up-and-down movement device 29 includes an actuator 31 that is supported on the side frame 22a and is linked to the link mechanism 25. The actuator 31 includes an electric motor 32 that generates motive power in response to the supply of electric power, and a transmission mechanism 33 that causes the link member 26 to rotate with respect to the side frame 22a around the horizontal axis SH in response to the motive power of the electric motor 32. The transmission mechanism 33 is formed from a sequentially meshing group of gears that include a drive gear that is fixed to for example a drive shaft of the electric motor 32 and a driven gear that is fixed to the link member 26 around the horizontal axis SH. Electric power is supplied based on the operation of the first switch 18a. The motive power of the electric motor 32 triggers up-and-down movement of the side frame 22a around the horizontal axis FH.

The seat back frame 23 includes sheet metal frames 23a linked to the inside of the individual side frames 22a on the swing axis SX, and an upper frame 23b connecting upper ends of the sheet metal frames 23a to each other. A pipe member 34 is fixed to the upper frame 23b, the pipe member 34 supporting a slide rod of the headrest 15 so that it can slide in the up-and-down direction.

An electric reclining device 35 is mounted on the sheet metal frame 23a of the seat back frame 23. The electric reclining device 35 includes an actuator 36 mounted on the side frame 22a of the seat cushion frame 22 around the swing axis SX. The actuator 36 is formed from an electric motor 37 that generates motive power in response to the supply of electric power, and a transmission mechanism 38 that converts the motive power of the electric motor 37 to a driving force around the swing axis SX. The electric motor 37 generates motive power in response to the supply of electric power. The electric power is supplied based on the operation of the second switch 18b. The motive power of the electric motor 37 causes the seat back frame 23 to swing back and forth around the swing axis SX with respect to the seat cushion frame 22.

Figure 3:
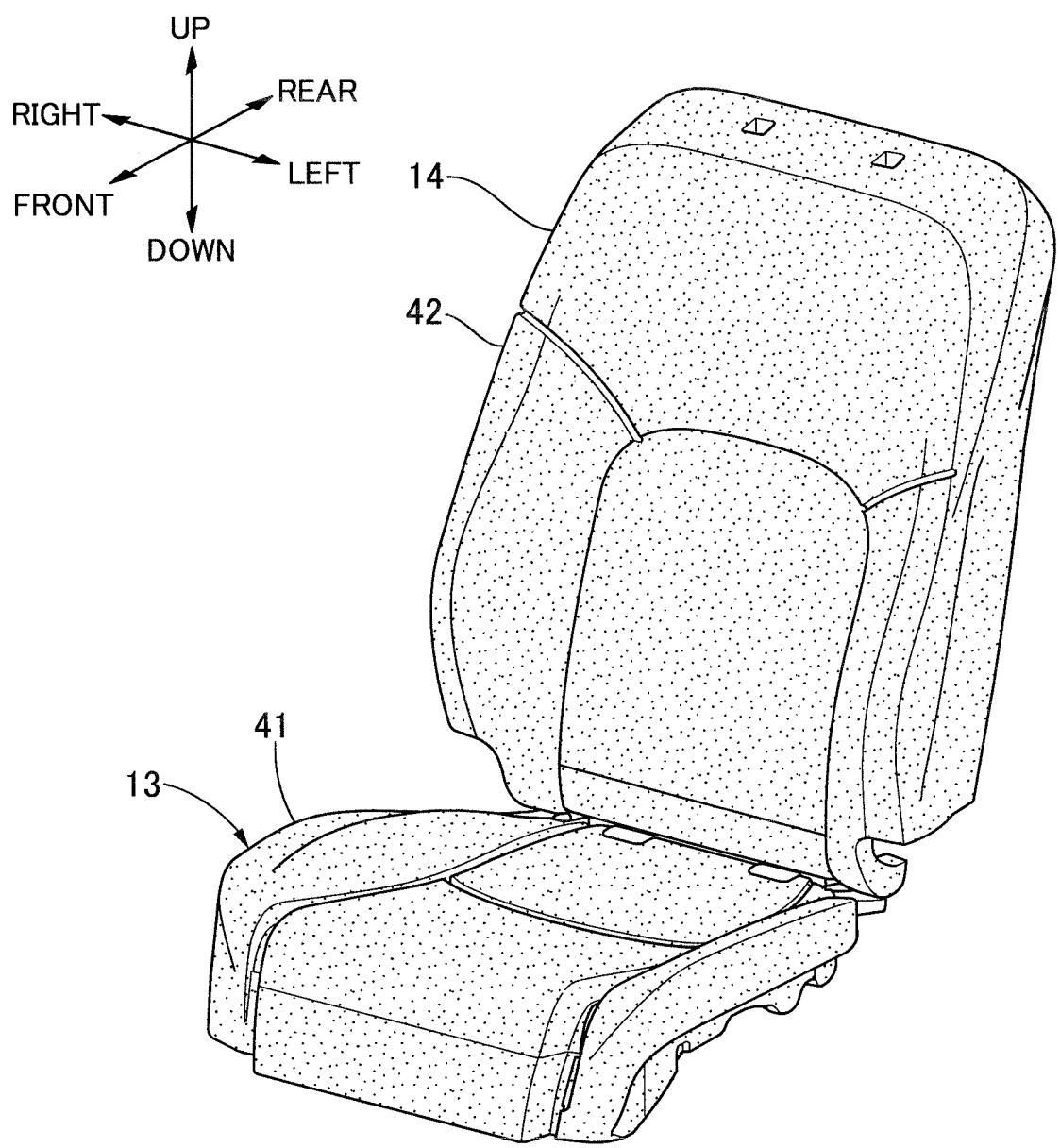
FIG. 3 is a perspective view schematically showing the arrangement of a seat cushion pad and a seat back pad.

As shown in FIG. 3, the seat cushion 13 further includes a seat cushion pad 41 that is supported on the seat cushion frame 22 and has the skin material 13a wrapped around it. The seat back 14 further includes a seat back pad 42 that is supported on the seat back frame 23 and has the skin material 14a wrapped around it. The seat cushion pad 41 and the seat back pad 42 are formed from a material having resilience such as for example a urethane foam.

Figure 4:
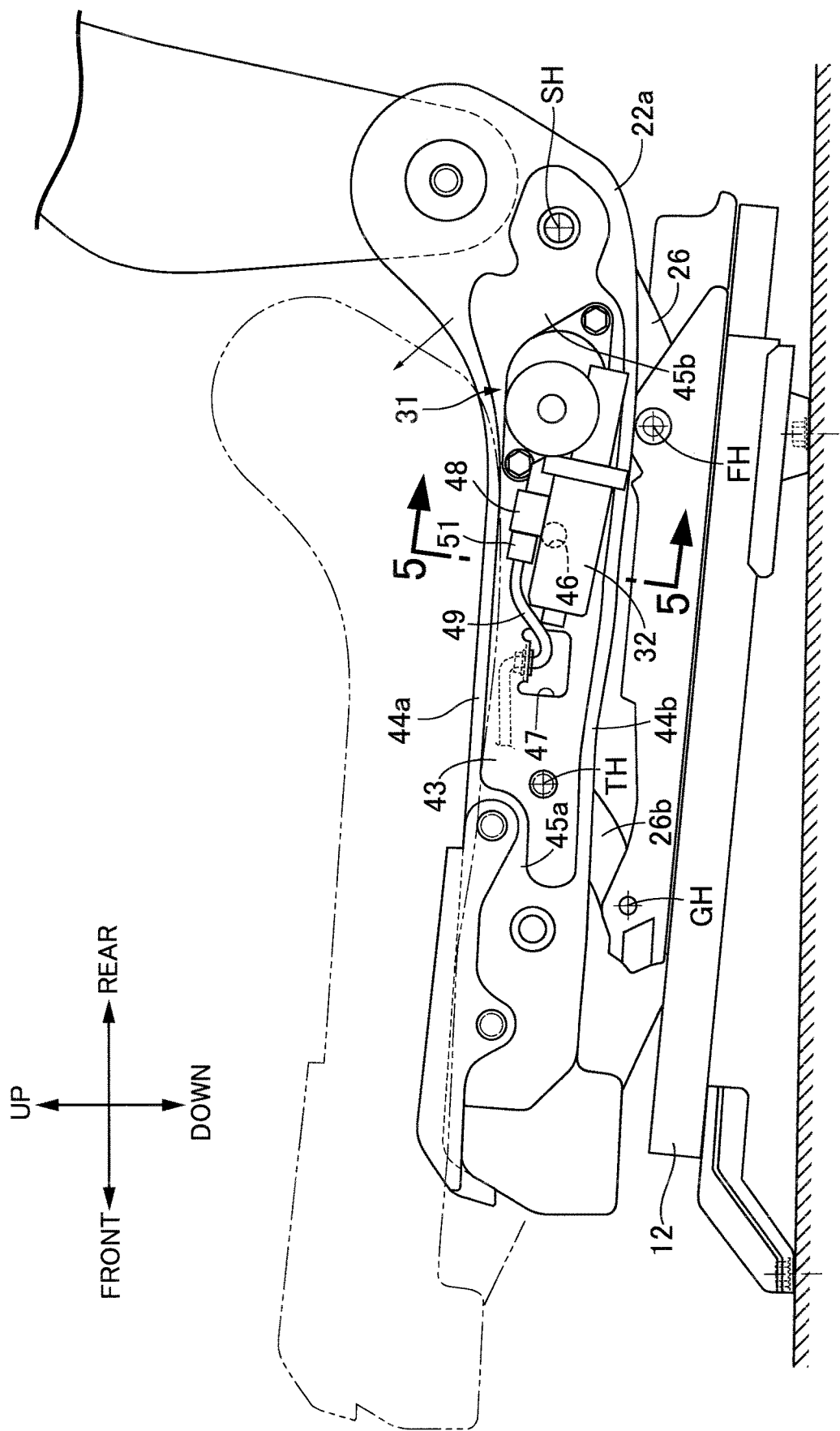
FIG. 4 is an enlarged left side view of a seat cushion frame and corresponds to a view in the direction of arrow 4 in FIG. 2. (first embodiment)

As shown in FIG. 4, the left side frame 22a of the seat cushion frame 22 has a plate-shaped part 43 and bent regions 44a and 44b that are bent from upper and lower edges of the plate-shaped part 43 and enhance the stiffness of the edges by the effect of being curved. In the plate-shaped part 43 the upper and lower edges extend in parallel with the side rail 12 in the fore-and-aft direction (longitudinal direction). The actuator 31 is mounted on the plate-shaped part 43. The bent regions 44a and 44b are formed as an upper and lower pair sandwiching a space that is in contact with a plate face of the plate-shaped part 43. The bent regions 44a and 44b define the plate-shaped part 43 as a band shape that is long in the fore-and-aft direction. The front end and the rear end of the bent region 44a are connected to the front end and the rear end respectively of the bent region 44b via rigid regions 45a and 45b. In this way the stiffness of the plate-shaped part 43 is enhanced. The rigid regions 45a and 45b are formed from a curved region that rises from the plate-shaped part 43.

A first opening 46 and a second opening 47 are bored in the plate-shaped part 43. The first opening 46 and the second opening 47 are disposed at positions spaced from the upper and lower bent regions 44a and 44b. The stiffness of the plate-shaped part 43 is therefore weakened at the positions of the first opening 46 and the second opening 47. The first opening 46 is disposed at a position where it faces the actuator 31. That is, when viewed from the side the first opening 46 overlaps the actuator 31. The second opening 47 is placed at a position that deviates forward from the first opening 46 in the longitudinal direction.

A female coupler 48 is mounted on the actuator 31. The female coupler 48 is disposed above the electric motor 32. A male coupler 51 is fitted into the female coupler 48, the male coupler 51 being linked to a harness 49 outside the side frame 22a. The harness 49 passes through the second opening 47 from the inside toward the outside of the side frame 22a. The female coupler 48 is disposed at a position at which it faces the first opening 46. The link mechanism 25 includes a link member 26b having one end that is joined to the base frame 24 so that it can rotate around a horizontal axis GH extending to the left and the right in parallel with the horizontal axis FH and another end that is joined to the seat cushion frame 22 so that it can rotate around a horizontal axis TH extending in the left-and-right direction in parallel with the horizontal axis GH. The link member 26b guides up-and-down movement of the seat cushion frame 22 with respect to the base frame 24 around the horizontal axis FH in cooperation with the link member 26b.

Figure 5:
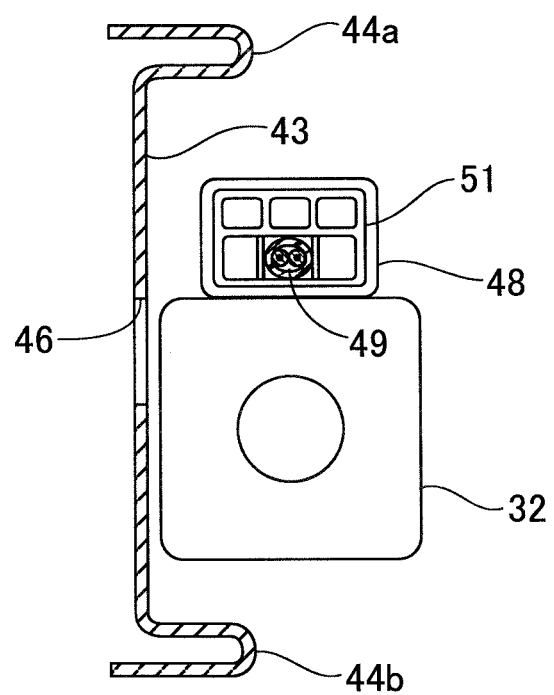
FIG. 5 is an enlarged sectional view along line 5-5 in FIG. 4. (first embodiment)

As shown in FIG. 5, the plate-shaped part 43 spreads along a vertical plane that is parallel to the direction of gravity. The bent regions 44a and 44b are folded back via upper ends that go away from the plate face of the plate-shaped part 43, thus forming a double wall. As shown in FIG. 4, the bent regions 44a and 44b have a longer dimension in the longitudinal direction along the edge compared with a gap where they face each other while sandwiching a space that is in contact with the plate face of the plate-shaped part 43.

Figure 6:
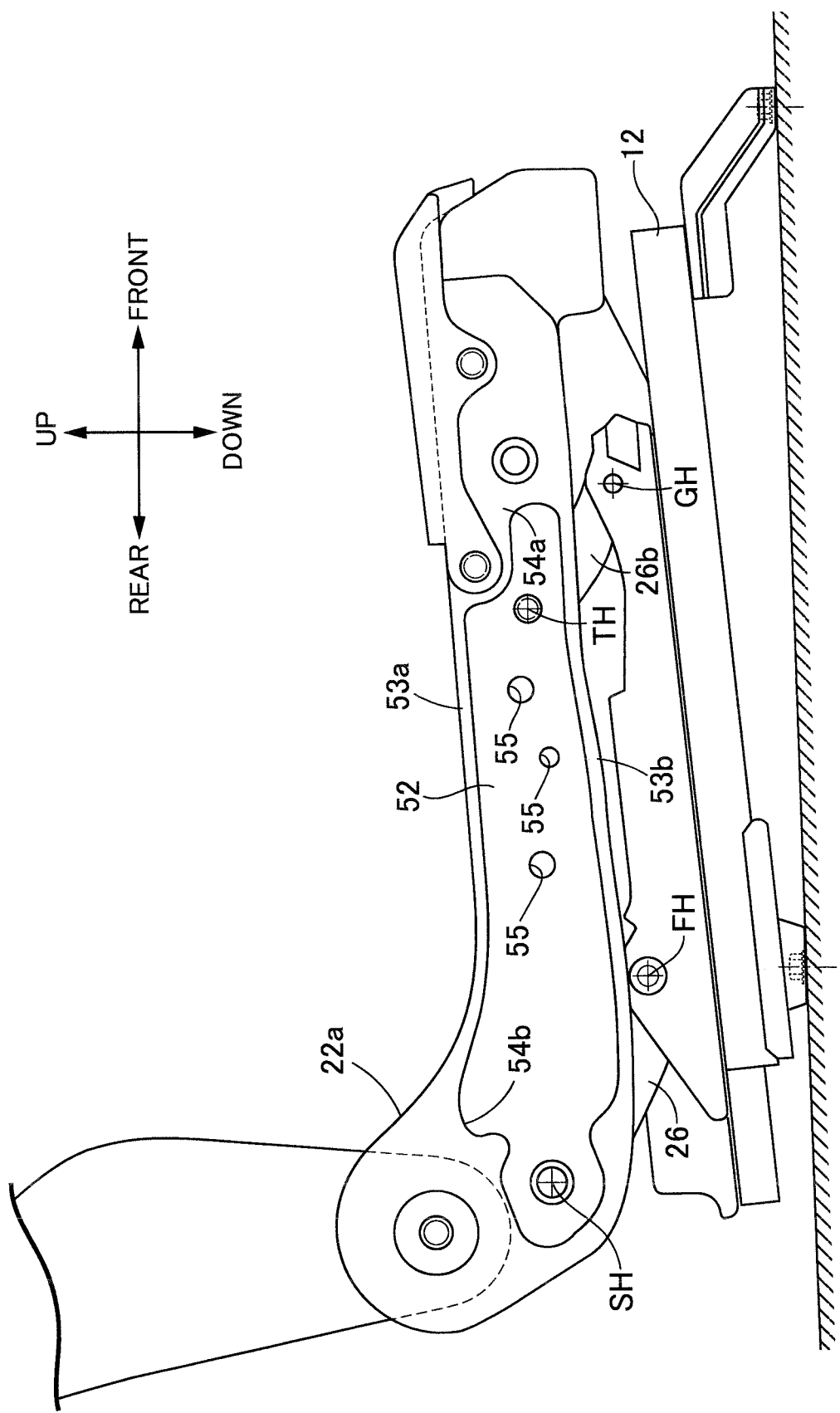
FIG. 6 is an enlarged right side view of the seat cushion frame and corresponds to a view in the direction of arrow 6 in FIG. 2. (first embodiment)

As shown in FIG. 6, the right side frame 22a of the seat cushion frame 22 has a plate-shaped part 52 and bent regions 53a and 53b that are bent from upper and lower edges of the plate-shaped part 52 and enhance the stiffness of the edges by the effect of being curved. In the plate-shaped part 52 the upper and lower edges extend in parallel with the slide rail 12 in the fore-and-aft direction (longitudinal direction). The bent regions 53a and 53b are formed as an upper and lower pair sandwiching a space that is in contact with a plate face of the plate-shaped part 52. The bent regions 53a and 53b define the plate-shaped part 52 as a band shape that is long in the fore-and-aft direction. The front end and the rear end of the bent region 53a are connected to the front end and the rear end respectively of the bent region 53b via rigid regions 54a and 54b. In this way the stiffness of the plate-shaped part 52 is enhanced. The rigid regions 54a and 54b are formed from curved regions rising from the plate-shaped part 52.

An opening 55 is bored in the plate-shaped part 43. The opening 55 is disposed at a position spaced from the upper and lower bent regions 53a and 53b. The stiffness of the plate-shaped part 52 is therefore weakened at the position of the opening 55. The openings 55 are disposed at intervals in the longitudinal direction. The right side frame 22a is provided with a larger number of openings than the number of openings provided in the left side frame 22a.

The operation of the present embodiment is now explained. The left side frame 22a is mounted on the actuator 31. The first opening 46 is formed in the plate-shaped part 43 of the left side frame 22a. Since the mass of the left side frame 22a is adjusted by the action of the first opening 46, resonance of the left side frame 22a with respect to operating vibration of the actuator 31 is suppressed. As a result, vibration noise of the left side frame 22a is reduced.

The left side frame 22a has the second opening 47 in the plate-shaped part 43 at a position that deviates from the first opening 46 in the longitudinal direction. Due to the increase in the openings in the plate-shaped part 43, vibration noise is further reduced. Moreover, since the female coupler 48 linked to the harness 49 outside the left side frame 22a is disposed at a position at which it faces the first opening 46, a state in which the female coupler 48 and the male coupler 51 are connected can be ascertained through the first opening 46 from the inside of the left side frame 22a.

The seat cushion frame 22 of the seat frame 21 has the pair of left and right side frames 22a. The actuator 31 is mounted on the plate-shaped part 43 of the left side frame 22a, the first opening 46 and the second opening 47 are formed therein and, moreover, the opening 55 is formed in the plate-shaped part 52 of the right side frame 22a. In the right side frame 22a, since the actuator 31 is not mounted and the stiffness of the plate-shaped part 52 is not reinforced, the plate-shaped part 52 has a large breadth and resonance easily occurs; due to the opening 55 being formed in the right side frame 22a the resonance of the right side frame 22a is suppressed. As a result, vibration noise of the seat frame 21 is reduced.

In the left side frame 22a the first opening 46 and the second opening 47 are disposed at positions spaced from the individual bent regions 44a and 44b. In the right side frame 22a the openings 55 are disposed at positions spaced from the individual bent regions 53a and 53b. The further the plate-shaped parts 43 and 52 are away from the bent regions 44a 44b, 53a and 53b, the more easily vibration occurs. Due to the first opening 46, the second opening 47 and the opening 55 being disposed in a region that is susceptible to vibration, the effect in suppressing resonance is enhanced.

The first opening 46 is disposed at a position at which it faces the actuator 31. In the plate-shaped part 43, since vibration easily occurs at a position close to the actuator 31, placing the first opening 46 at a position at which it faces the actuator 31 enables resonance to be suppressed effectively.

The left side frame 22a has the bent regions 44a and 44b, which are bent from the edge of the plate-shaped part 43 and enhance the stiffness of the edge by the effect of being curved. Since the stiffness of the plate-shaped part 43 is enhanced by the action of the bent regions 44a and 44b, resonance of the left side frame 22a is suppressed. The right side frame 22a similarly has the bent regions 53a and 53b, which enhance the stiffness of the edge of the plate-shaped part 52. The stiffness of the plate-shaped part 52 is enhanced by the action of the bent regions 53a and 53b.

The bent regions 44a and 44b of the left side frame 22a are folded back via the upper ends, which go away from the plate face of the plate-shaped part 43, thus forming a double wall. The stiffness of the bent regions 44a and 44b is reliably enhanced. The stiffness of the left side frame 22a is ensured. Similarly, the bent regions 53a and 53b of the right side frame 22a form a double wall. The stiffness of the bent regions 53a and 53b is ensured.

The bent regions 44a and 44b of the left side frame 22a are formed as a pair sandwiching a space that is in contact with the plate face of the plate-shaped part 43. Since the space, which is in contact with the plate face and is adjacent to the first opening 46, is sandwiched by the bent regions 44a and 44b, even when the first opening 46 is formed in the plate-shaped part 43, the stiffness of the plate-shaped part 43 is ensured. The bent regions 53a and 53b of the right side frame 22a are formed as a pair sandwiching a space that is in contact with the plate face of the plate-shaped part 52. Even when the openings 55 are formed in the plate-shaped part 52, the stiffness of the plate-shaped part 52 is ensured.

In the left side frame 22a the bent regions 44a and 44b have a long dimension in the longitudinal direction along the edge of the plate-shaped part 43 compared with the gap via which they sandwich a space that is in contact with the plate face of the plate-shaped part 43 and face each other, and define the plate-shaped part 43 as having a band shape along the longitudinal direction. Since the bent regions 44a and 44b extend lengthwise along the edge of the plate-shaped part 43 compared with the breadth of the plate-shaped part 43, the stiffness of the plate-shaped part 43 is reliably enhanced. Similarly, in the right side frame 22a the bent regions 53a and 53b have a long dimension in the longitudinal direction along the edge of the plate-shaped part 52 compared with a gap via which they sandwich a space that is in contact with the plate face of the plate-shaped part 52 and face each other, and define the plate-shaped part 52 as having a band shape along the longitudinal direction. Since the bent regions 53a and 53b extend lengthwise along the edge of the plate-shaped part 52 compared with the breadth of the plate-shaped part 52, the stiffness of the plate-shaped part 52 is reliably enhanced.

The right side frame 22a is provided with a larger number of the openings 55 than the number of openings 46 and 47 provided in the left side frame 22a. Since the actuator 31 is not mounted on the right side frame 22a, resonance occurs more easily in the right side frame 22a than in the left side frame 22a, but due to the larger number of openings being formed in the right side frame 22a than in the left side frame 22a the resonance of the right side frame 22a is suppressed.

The invention claimed is:

1. A vehicle seat comprising
   a seat frame having a first opening formed in a plate-shaped part, and
   an actuator mounted on the plate-shaped part,
   wherein:
   the first opening is disposed at a position facing the actuator, the first opening being in a state where no member is mounted thereto,
   the seat frame has a second opening in the plate-shaped part at a position that deviates from the first opening,
   a harness is provided to pass through the second opening from an inside toward an outside, and
   at least part of the harness extends between the first opening and the second opening.

2. The vehicle seat according to claim 1, wherein the harness is arranged at a position not overlapped with the first opening when viewed in a widthwise direction.

3. The vehicle seat according to claim 2, wherein at least part of the harness is arranged above the first opening.

4. The vehicle seat according to claim 3, wherein a coupler is linked to the harness, and at least part of the coupler is arranged above the first opening.

5. The vehicle seat according to claim 3, wherein the coupler is disposed at a position facing toward the first opening.

6. The vehicle seat according to claim 1, wherein a link member is provided at a rear of the seat frame, and wherein the first opening is arranged between the second opening and the link member.

7. The vehicle seat according to claim 1, wherein a width of the second opening, in an up-and-down direction or in a front-to-rear direction, is greater than a width of the first opening in the up-and-down direction or in the front-to-rear direction.

8. The vehicle seat according to claim 1, wherein the actuator has a front end portion thereof arranged at a position between the first opening and the second opening.

9. The vehicle seat according to claim 1, further comprising a slide rail disposed below the seat frame, wherein the first opening and the second opening are arranged at a position between front and rear ends of the slide rail.

10. A method of producing a vehicle seat which comprises a seat frame including a plate-shaped part having a first opening and a second opening formed therein, the second opening disposed at a position that deviates from the first opening, the method comprising steps of:
mounting an actuator equipped with an electric motor proximate the plate-shaped part of the seat frame;
arranging the electric motor at a position facing the first opening, the first opening having no member mounted thereto;
mounting a harness so as to pass through the second opening from an inside toward an outside; and
arranging at least part of the harness to extend between the first opening and the second opening.

* * * * *